United States Patent
Hsu et al.

(10) Patent No.: US 7,216,245 B2
(45) Date of Patent: May 8, 2007

(54) SYSTEM AND METHOD FOR DETERMINING IF POWER SHOULD BE SUSPENDED TO AT LEAST ONE PERIPHERAL BASED ON ANALYZING A POWER SUPPLY MODE IN A STOP GRANT MESSAGE

(75) Inventors: Ming-Wei Hsu, Taipei (TW); Kuan-Jui Ho, Taipei (TW)

(73) Assignee: VIA Technologies Inc., Taipei (TW)

( * ) Notice: Subject to any disclaimer, the term of this patent is extended or adjusted under 35 U.S.C. 154(b) by 425 days.

(21) Appl. No.: 10/803,323

(22) Filed: Mar. 18, 2004

(65) Prior Publication Data

US 2005/0039063 A1    Feb. 17, 2005

(30) Foreign Application Priority Data

Aug. 14, 2003    (TW) ............................... 92122428 A

(51) Int. Cl.
G06F 1/00    (2006.01)
G06F 1/32    (2006.01)
(52) U.S. Cl. ...................................... 713/324; 713/320
(58) Field of Classification Search ................ 713/300, 713/320, 324
See application file for complete search history.

(56) References Cited

U.S. PATENT DOCUMENTS 6,732,280 B1 * 5/2004 Cheok et al. ............... 713/300
2003/0204686 A1 * 10/2003 Hesse et al. ................ 711/154
2004/0255170 A1 * 12/2004 Yang et al. ................. 713/300

FOREIGN PATENT DOCUMENTS

TW                 448352         8/2001

OTHER PUBLICATIONS

Advanced Micro Devices, HyperTransport Technology I/O Link: A High-Bandwidth I/O Architecture, Jul. 20, 2001, pp. 1-25.*

* cited by examiner

Primary Examiner—Thomas Lee
Assistant Examiner—Mark Connolly
(74) Attorney, Agent, or Firm—Thomas, Kayden, Horstemeyer & Risley

(57) ABSTRACT

A computer system with power management and the method thereof. First, the CPU outputs a power management signal to the south bridge. The south bridge responds with a stop clock signal, and then the CPU responds with a stop grant message. The north bridge receives and analyzes the stop grant message to identify a power supply mode. If the power supply mode is to suspend the main power supplied from the power supply, the north bridge outputs a state transition signal to the peripheral, which then responds with an acknowledge signal. The north bridge passes the stop grant message to the south bridge after receiving the acknowledge signal. The south bridge receives the stop grant message and outputs a power control signal accordingly. The power supply receives the power control signal for suspending the corresponding power accordingly.

17 Claims, 4 Drawing Sheets

SYSTEM AND METHOD FOR DETERMINING IF POWER SHOULD BE SUSPENDED TO AT LEAST ONE PERIPHERAL BASED ON ANALYZING A POWER SUPPLY MODE IN A STOP GRANT MESSAGE

This application claims the benefit of Taiwan application Serial No. 092122428, filed Aug. 14, 2003, the subject matter of which is incorporated herein by reference.

BACKGROUND OF THE INVENTION

1. Field of the Invention

The invention relates to a computer system with power management and the method thereof, and more particularly to a computer system with power management for a peripheral supporting the PCI express, and the method thereof.

2. Description of the Related Art

The power management is to optimize the power in a most efficiency way and thus save the power consumption. FIG. 1 is a schematic illustration showing a computer system. The computer 100 includes a CPU (Central Processing Unit) 110, a north bridge 120, a south bridge 130, and a power supply 140. The CPU 110 communicates with the power supply 140 and other peripherals (not shown in the drawing) via the north bridge 120 and the south bridge 130. The power supply 140 supplies a main power and an auxiliary power for powering the computer 100 to operate. The power supply modes typically include C2, C3, S3, S4, S5 modes, and the like. The modes C2 and C3 are used to save the power consumption of the CPU 110, while the modes S3, S4 and S5 are used to suspend the main power.

FIG. 2 is a flow chart showing a power management method in a typical computer system. First, in step 210, when the computer wants to enter a power-saving mode, such as a sleep mode S3, S4 or S5, the CPU 110 passes a power management signal to a power management unit of the south bridge 130 via the north bridge 120 by accessing a PMIO register of the south bridge 130 according to the indication from the operation system. Then, in step 220, the south bridge 130 receives the power management signal and immediately responds with a stop clock cycle STPCLK to inform the CPU 110 that the requested power supply mode will be entered. In step 230, the CPU 110 receives the stop clock cycle STPCLK and immediately responds with a stop grant cycle STPGNT to represent that the sleep mode is ready to be entered. The north bridge 120 receives the stop grant cycle STPGNT and immediately passes it to the south bridge 130, as shown in step 240. Next, the south bridge 130 receives the stop grant cycle STPGNT and immediately outputs a power control signal to the power supply 140. For example, the south bridge 130 outputs a power control signal SUSB to the power supply when the mode S3 is to be entered, or the south bridge 130 outputs a power control signal SUSC to the power supply when the mode S4 or S5 is to be entered. Finally, the power supply 140 receives the power control signal and immediately suspends the corresponding power, as shown in step 260.

Serially connected peripherals, such as PCI express peripherals that are electrically connected to the north bridge by PCI express link, have been gradually developed in order to meet the demands on the high-speed peripherals. FIG. 3 is a schematic illustration showing power management state transitions for a PCI express link. The PCI express link operates at a full speed under the normal condition referred to as the state L0. The PCI express link has to enter the state L2 or L3 for saving power. At this time, the power supply stops supplying the main power to the PCI express device. However, before entering the state L2 or L3, the link has to first enter the state of L2/L3 ready. However, because the conventional power management method is only controlled by the CPU and the south bridge, and the north bridge cannot identify the change of the power supply mode, the PCI express peripheral cannot be informed in advance. Under the condition that the PCI express link cannot identify the change of the power supply mode of the computer, the PCI express peripheral cannot be transited to the state of L2/L3 ready. Instead, the PCI express link jumps from the state L0 to the state L2 or L3, and abnormal conditions will be caused during the initialization of the next rebooting process.

SUMMARY OF THE INVENTION

It is therefore an object of the invention to provide an computer system with power management and the method thereof to support the PCI express peripherals.

The invention achieves the above-identified object by providing a computer system with power management. The computer system includes a CPU, a north bridge, a south bridge, a power supply and at least one peripheral electrically connected to the north bridge. The north bridge includes a decoding unit, and the CPU communicates with the north bridge according to the hyper transport I/O link protocol.

The invention also achieves the above-identified object by providing a power management method for a computer system. The method includes the following steps. First, the CPU outputs a power management signal to the south bridge. The south bridge responds with a stop clock signal, and then the CPU responds with a stop grant message. The north bridge receives and analyzes the stop grant message to identify a power supply mode. If the power supply mode is to suspend the main power supplied from the power supply, the north bridge outputs a state transition signal to the peripheral, which then responds with an acknowledge signal after the PCI Express link state transition has been made. The north bridge passes the stop grant message to the south bridge after receiving the acknowledge signal. The south bridge receives the stop grant message and outputs a power control signal accordingly. The power supply receives the power control signal for suspending the corresponding power accordingly.

Other objects, features, and advantages of the invention will become apparent from the following detailed description of the preferred but non-limiting embodiments. The following description is made with reference to the accompanying drawings.

DETAILED DESCRIPTION OF THE INVENTION

The PCI express link operates at a full speed under the normal condition referred to as the state L0. The PCI express link has to enter the state L2 or L3 for saving power. At this time, the power supply stops supplying the main power to the PCI express device. However, before entering the state L2 or L3, the link has to first enter the state of L2/L3 ready. Because the conventional power management method is only controlled by the CPU and the south bridge, and the north bridge cannot identify the change of the power supply mode, the PCI express peripheral cannot be informed in advance. Under the condition that the PCI express peripheral cannot identify the change of the power supply mode of the computer, the PCI express link cannot be switched to the state of L2/L3 ready. Instead, the PCI express link jumps from the state L0 to the state L2 or L3, and abnormal conditions will be caused.

The invention is provided to improve the conventional power management method such that the PCI express peripheral may identify the change of the power supply mode in advance and make the correspondingly response. The invention is suitable for the CPU, such as that of K8 series of AMD, having the hyper transport I/O link protocol.

Figure 1:
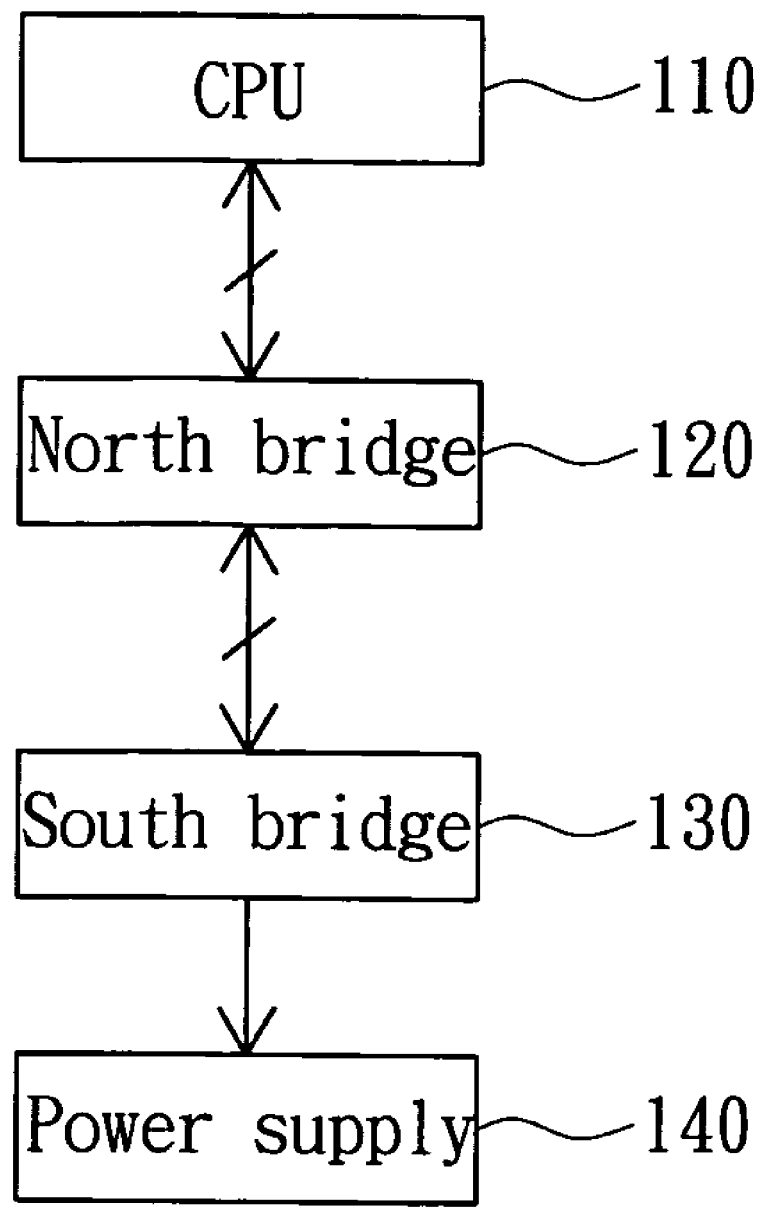
FIG. 1 is a schematic illustration showing a computer system.
Figure 2:
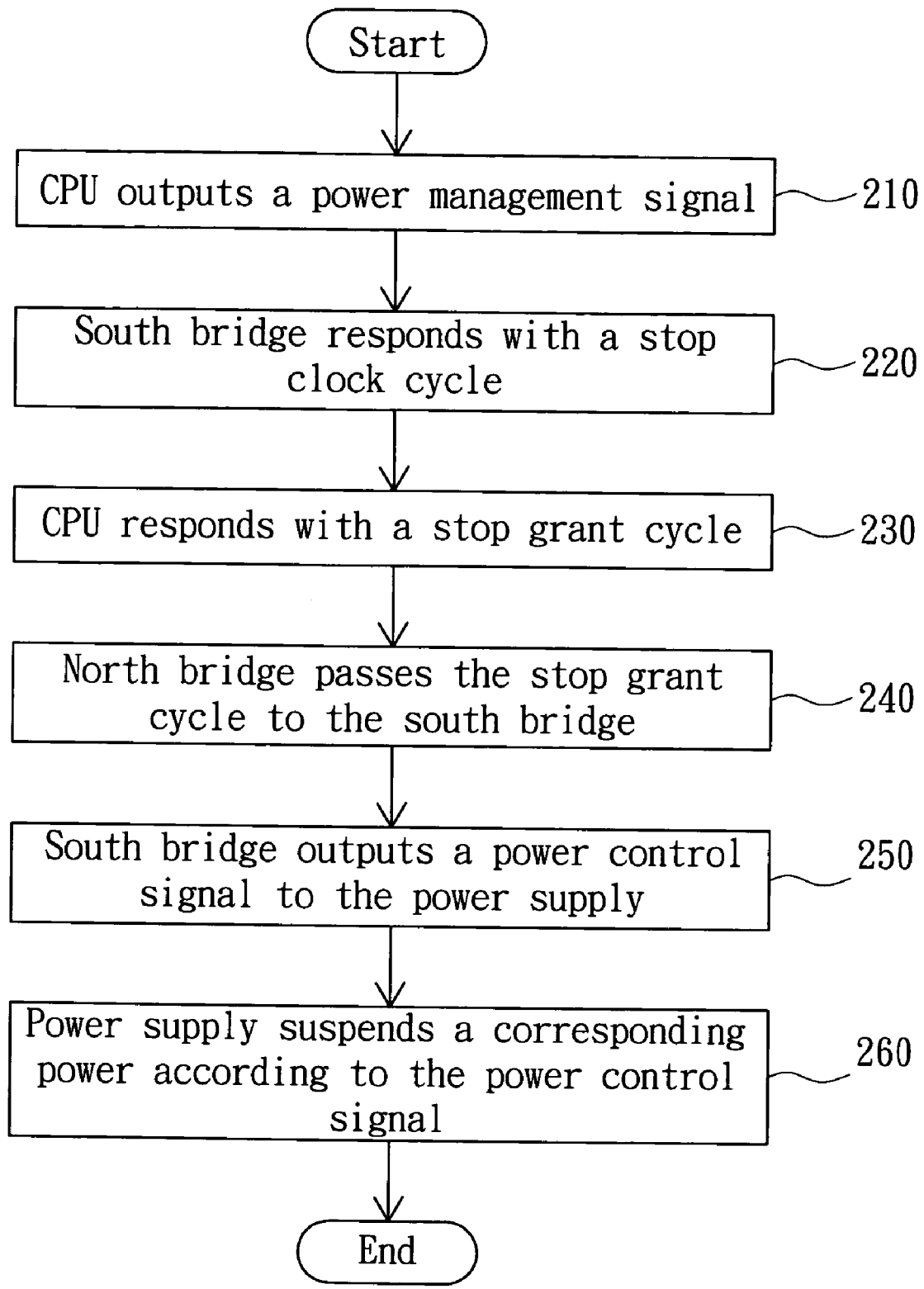
FIG. 2 is a flow chart showing a power management method in a typical computer system.
Figure 3:
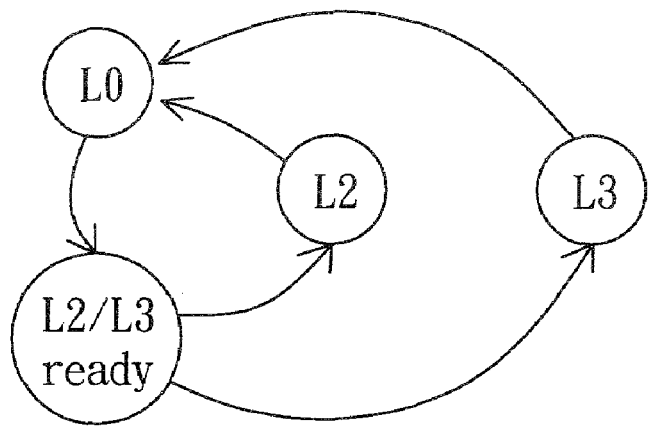
FIG. 3 is a schematic illustration showing power management state transitions for a PCI express link.
Figure 4:
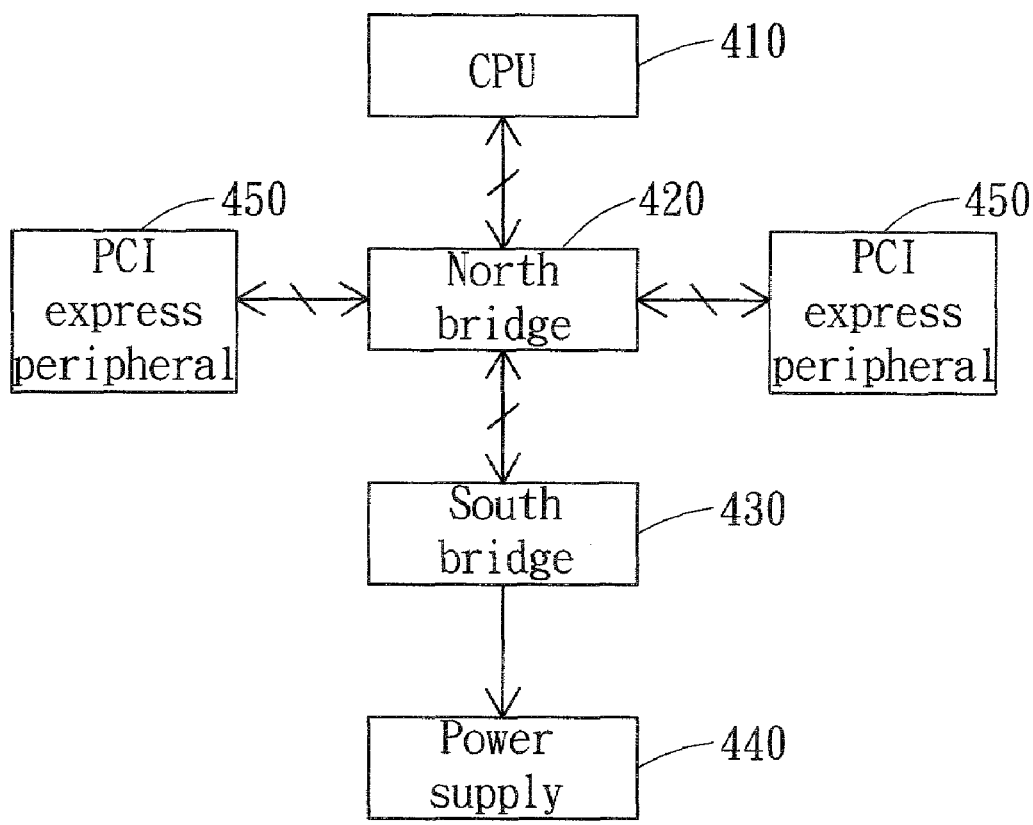
FIG. 4 is a schematic illustration showing the architecture of a computer system with power management according to a preferred embodiment of the invention.

FIG. 4 is a schematic illustration showing the architecture of a computer system with power management according to a preferred embodiment of the invention. The computer 400 includes a CPU 410, a north bridge 420, a south bridge 430 and a power supply 440. The CPU 410 communicates with the power supply 440 and other peripherals via the north bridge 420 and the south bridge 430. The peripheral may be, for example, a PCI express peripheral 450 that is electrically connected to the north bridge 420 by PCI Express link. The CPU 410 communicates with the north bridge 420 according to the hyper transport I/O link protocol. The power supply 440 supplies a main power and an auxiliary power for powering the computer 400 to operate. The power supply modes of the power supply 440 typically include C2, C3, S3, S4, S5 modes, and the like. The modes C2 and C3 are used to save the power consumption of the CPU 410, while the modes S3, S4 and S5 are used to suspend the main power.

A stop grant message STPGNT, which is output from the CPU 410 having the hyper transport I/O link protocol during the changing procedure of the power supply mode, has a system management action field SMAF for indicating which power supply mode is responsive to the stop grant message STPGNT. Thus, the invention creates a decoding unit in the north bridge 420 to analyze which power supply mode is responsive to the stop grant message STPGNT. If the decoding unit finds that the power supply mode in responsive to the stop grant message STPGNT is the mode S3, S4 or S5, the north bridge will inform each PCI express peripheral to enter the state of L2/L3 ready, and then pass the stop grant message STPGNT to the south bridge.

Figure 5:
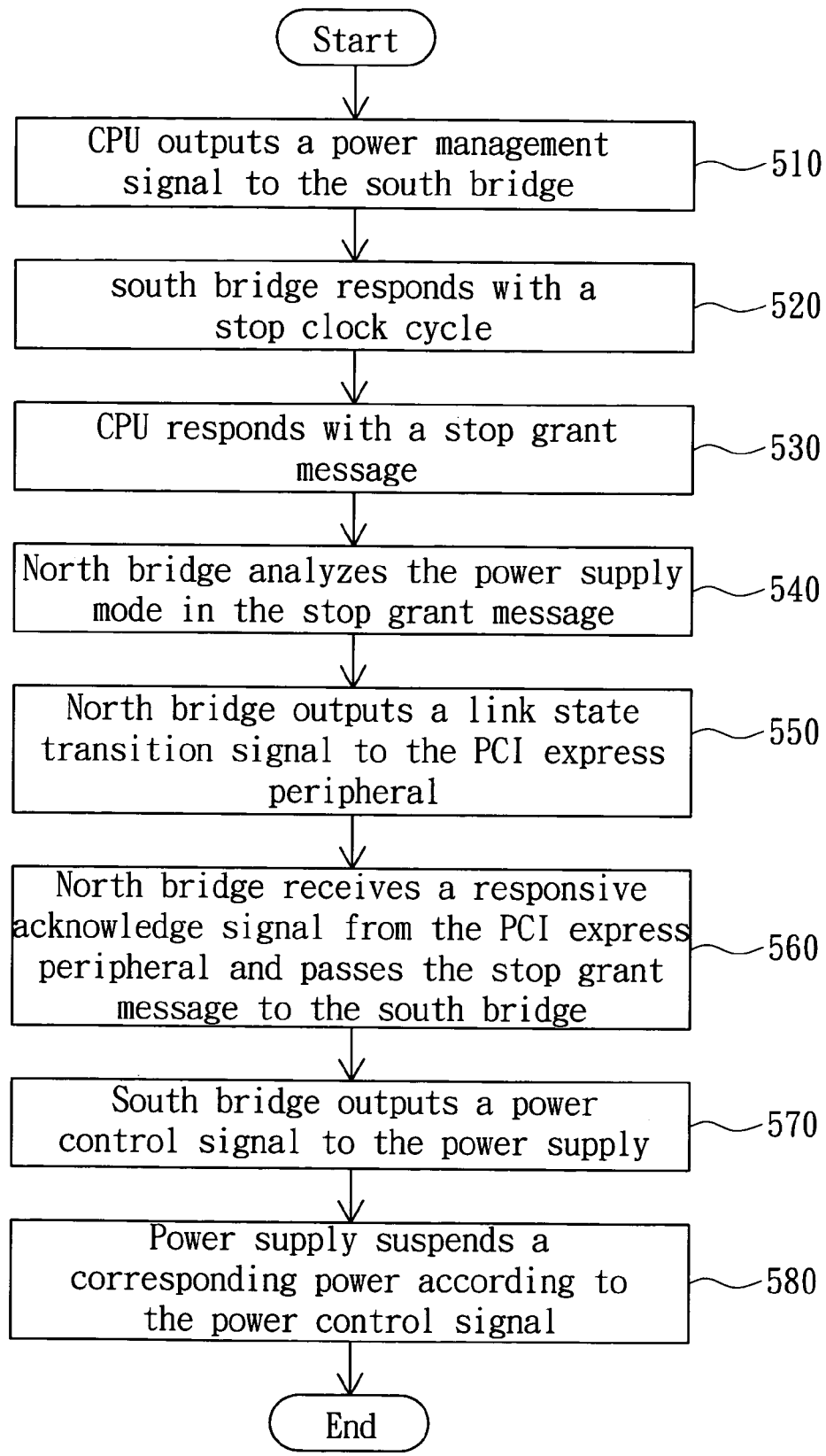
FIG. 5 is a flow chart showing a power management method of the computer system.

FIG. 5 is a flow chart showing a power management method of the computer system. First, in step 510, when the computer wants to enter the power-saving mode, such as the sleep mode S3, S4 or S5, the CPU 410 passes a power management signal to a power management unit of the south bridge 430 via the north bridge 420 by accessing a PMIO register of the south bridge 430 according to the indication from the operation system. Then, in step 520, the south bridge 430 receives the power management signal and immediately responds with a stop clock cycle STPCLK to the CPU 410 to inform the CPU 410 that the requested power supply mode will be entered. In step 530, the CPU 410 receives the stop clock cycle STPCLK and immediately responds with a stop grant message STPGNT to represent that the sleep mode is ready to be entered. In step 540, the north bridge 420 receives the stop grant message STPGNT and the decoding unit of the north bridge immediately analyzes the power supply mode of the system management action field SMAF of the stop grant message STPGNT. If the power supply mode represented by the stop grant message STPGNT is the mode S3, S4 or S5, then the north bridge 420 outputs a PCI Express link state transition signal to all the PCI express peripherals 450 and to inform the PCI express peripherals 450 to put the PCI Express link into the state of L2/L3 ready, as shown in step 550. If the north bridge 420 receives the responsive signals ACK of all PCI express peripherals 450, then the north bridge 420 passes the stop grant message STPGNT to the south bridge 430, as shown in step 560. In step 570, the south bridge 430 receives the stop grant message STPGNT and immediately outputs a power control signal to the power supply 440. For example, the south bridge 430 outputs a power control signal SUSB to the power supply 440 when the mode S3 is to be entered, or the south bridge 430 outputs a power control signal SUSC to the power supply 440 when the mode S4 or S5 is to be entered. Finally, the power supply 440 receives the power control signal and immediately suspends the corresponding power, as shown in step 580.

The power management method and device according to the embodiment of the invention may intercept the message between the CPU and the south bridge and thus identify whether or not the main power is to be suspended. If the main power is to be suspended, the PCI express peripheral is informed in advance to prevent the problem of failing to initialize the PCI express link in the next rebooting procedure.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A power management method applied to a computer system, which is going to enter a power-saving mode, the computer system comprising a CPU, a north bridge communicating with the CPU according to a hyper transport I/O link protocol, a south bridge, a power supply, and at least one peripheral electrically connected to the north bridge, the method comprising the steps of:

enabling the CPU to output a power management signal to the south bridge via the north bridge;

enabling the south bridge to respond with a stop clock cycle to the CPU according to the power management signal;

enabling the CPU to respond with a stop grant message according to the stop clock signal;

enabling the north bridge to receive the stop grant message and analyze a power supply mode in the stop grant message, and enabling the north bridge to output a state transition signal to the at least one peripheral if the power supply mode is to suspend a main power supplied from the power supply;

enabling the at least one peripheral to respond with an acknowledge signal after the at least one peripheral finishes its state transition according to the state transition signal;

enabling the north bridge to pass the stop grant message to the south bridge after the north bridge receives the acknowledge signal;

enabling the south bridge to output a power control signal after the south bridge receives the stop grant message; and enabling the power supply to suspend a corresponding power after the power supply receives the power control signal;

wherein the north bridge comprises a decoding unit for analyzing the power supply mode in the stop grant message; and the power supply mode is identified by analyzing, by the decoding unit, a system management action field (SMAF) in the stop grant message.

2. The power management method according to claim 1, wherein the at least one peripheral is a PCI express peripheral.

3. The power management method according to claim 2, wherein the PCI express link is transited from a state L0 to another state of L2/L3 ready according to the received state transition signal output from the north bridge.

4. A computer system with power management, the computer system comprising:
   a CPU;
   a north bridge comprising a decoding unit, the north bridge communicating with the CPU according to a hyper transport I/O link protocol;
   a south bridge communicating with the CPU via the north bridge;
   a power supply; and
   at least one peripheral electrically connected to the north bridge, wherein:
   when the computer system has to enter a power-saving mode, the CPU outputs a power management signal to the south bridge via the north bridge;
   the south bridge then responds with a stop clock cycle to the CPU according to the power management signal;
   the CPU then responds with a stop grant message according to the stop clock signal;
   the north bridge then receives the stop grant message;
   the decoding unit analyzes a power supply mode in the stop grant message, wherein the decoding unit analyzes a system management action field (SMAF) in the stop grant message to identify the power supply mode;
   the north bridge outputs a state transition signal to the at least one peripheral if the power supply mode is to suspend a main power supplied from the power supply;
   the at least one peripheral then responds with an acknowledge signal according to the state transition signal;
   the north bridge passes the stop grant message to the south bridge after receiving the acknowledge signal;
   the south bridge then receives the stop grant message and outputs a power control signal accordingly; and
   the power supply then receives the power control signal and suspends a corresponding power accordingly.

5. The computer system according to claim 4, wherein the at least one peripheral is a PCI express peripheral.

6. The computer system according to claim 5, wherein the PCI express peripheral is transited from a state L0 to another state of L2/L3 ready after it receives the state transition signal output from the north bridge.

7. A power management method applied to a computer system, which is going to enter a power-saving mode, the computer system comprising a CPU, a north bridge communicating with the CPU according to a hyper transport I/O link protocol, a south bridge, a power supply, and at least one peripheral electrically connected to the north bridge, the method comprising the steps of:

(a) requesting to enter a power-saving mode, step (a) comprising:
   outputting a power management signal;
   responding with a stop clock cycle according to the power management signal; and
   responding with a stop grant message according to the stop clock signal;

(b) determining whether or not to inform the at least one peripheral to transit its state according to a packet of the hyper transport I/O link protocol, step (b) comprising:
   receiving the stop grant message:
   analyzing a power supply mode in the stop grant message and outputting a state transition signal to the at least one peripheral if the power supply mode is to suspend a main power supplied from the power supply, wherein the power supply mode is identified by analyzing a system management action field (SMAF) in the stop grant message; and
   passing the stop grant message; and (c) suspending a corresponding power according to the power-saving mode.

8. The power management method according to claim 7, wherein the CPU outputs the power management signal to the south bridge via the north bridge.

9. The power management method according to claim 7, wherein the south bridge outputs the stop clock cycle to the CPU according to the power management signal.

10. The power management method according to claim 7, wherein the CPU responds with a stop grant cycle according to the stop clock signal.

11. The power management method according to claim 7, wherein the packet of the hyper transport I/O link protocol is the stop grant message.

12. The power management method according to claim 7, wherein the at least one peripheral is a PCI express peripheral.

13. The power management method according to claim 12, wherein the PCI express peripheral is transited from a state L0 to another state of L2/L3 ready after it receives the state transition signal output from the north bridge.

14. The power management method according to claim 7, wherein the step (b) is performed by the north bridge.

15. The power management method according to claim 7, wherein the step (c) comprises:
   outputting a power control signal according to the stop grant message; and
   suspending the corresponding power according to the power control signal.

16. The power management method according to claim 15, wherein the south bridge outputs the power control signal.

17. The power management method according to claim 15, wherein the power supply suspends the corresponding power.

* * * * *